United States Patent [19]

Stark

[11] Patent Number: 5,262,648

[45] Date of Patent: Nov. 16, 1993

[54] MEDICAL DIAGNOSTIC NUCLEAR CAMERA FORK MOUNTING WITH OFFSET

[75] Inventor: Iain Stark, Dollard des Ormeaux, Canada

[73] Assignee: Independent Scintillation Imaging Systems (ISIS) Inc., Lachine, Canada

[21] Appl. No.: 16,097

[22] Filed: Feb. 10, 1993

[51] Int. Cl.$^5$ ............................................. G01T 1/166
[52] U.S. Cl. ........................... 250/363.05; 250/363.02; 250/363.04; 250/363.08
[58] Field of Search ...................... 250/363.08, 363.05, 250/363.04, 363.02

[56] References Cited

U.S. PATENT DOCUMENTS

| | | | |
|---|---|---|---|
| 3,624,398 | 11/1971 | Arndt | 378/173 |
| 3,982,133 | 9/1976 | Jupa et al. | 378/148 |
| 4,088,889 | 5/1978 | Meixner | 378/167 |
| 4,109,155 | 8/1978 | Tschunt et al. | 378/148 |
| 4,129,784 | 12/1978 | Tschunt et al. | 378/148 |
| 4,220,861 | 9/1980 | Colombo et al. | 250/363.05 |
| 4,221,971 | 9/1980 | Burger | 378/148 |
| 4,241,254 | 12/1980 | Välilä378 | 40/ |
| 4,365,342 | 12/1982 | Vepy | 378/173 |
| 4,445,035 | 4/1984 | Ueyama | 250/363.04 |
| 4,459,485 | 7/1984 | Span | 250/363.05 |
| 4,460,832 | 7/1984 | Bigham | 250/505.1 |
| 4,476,389 | 10/1984 | Ueyama et al. | 250/363.05 |
| 4,517,460 | 5/1985 | Meulenbrugge et al. | 250/252.1 |
| 4,541,108 | 9/1985 | Grady et al. | 378/196 |
| 4,645,933 | 2/1987 | Gambini et al. | 250/363.05 |
| 4,649,277 | 3/1987 | Terra et al. | 250/363.05 |
| 4,652,759 | 3/1987 | Platz | 250/363.05 |
| 4,669,105 | 5/1987 | Fenster et al. | 378/146 |
| 4,692,625 | 9/1987 | Hanz et al. | 250/363.08 |
| 4,694,481 | 9/1987 | Tashjian et al. | 378/198 |
| 4,716,581 | 12/1987 | Barud | 378/198 |
| 4,741,015 | 4/1988 | Charrier | 378/196 |
| 4,758,726 | 7/1988 | Douma et al. | 250/363.10 |
| 4,774,411 | 9/1988 | Span | 250/363.05 |
| 4,774,421 | 9/1988 | Kurkake | 250/363.08 |
| 4,809,313 | 2/1989 | Gandolfo | 378/182 |
| 5,047,641 | 9/1991 | Besseling et al. | 250/363.08 |
| 5,059,799 | 10/1991 | Kurakake | 250/363.10 |
| 5,075,554 | 12/1991 | Yunker et al. | 250/363.08 |
| 5,146,094 | 9/1992 | Stark | 250/363.08 |

FOREIGN PATENT DOCUMENTS

| | | |
|---|---|---|
| 0465952 | 1/1992 | European Pat. Off. |
| 58-30685 | 2/1983 | Japan . |
| 59-17838 | 10/1984 | Japan . |
| 63-90787 | 4/1988 | Japan . |
| 2-263185 | 10/1990 | Japan . |

OTHER PUBLICATIONS

International search report from the European Patent Office dated Jan. 11, 1993.

*Primary Examiner*—Constantine Hannaher
*Attorney, Agent, or Firm*—ROBIC

[57] ABSTRACT

A positioner apparatus for a scintillation camera comprises a rotating frame unit, a camera fork mounting provided on the unit for totatably mounting and rotating a camera fork about a first axis, and an eccentric mounting for rotatably mounting the camera to ends of the fork, and for rotating the camera about a second axis extending between the fork ends and at an offset distance with respect to the first axis. By rotating the camera 180° about the second axis and the fork 180° about the first axis, an aperture of the camera faces in the same direction, but at a different radial position for CAT scans.

5 Claims, 3 Drawing Sheets

MEDICAL DIAGNOSTIC NUCLEAR CAMERA FORK MOUNTING WITH OFFSET

FIELD OF THE INVENTION

The present invention relates to a medical diagnostic nuclear camera positioner apparatus. In particular, the invention relates to a fork mounting for a nuclear camera with an offset.

BACKGROUND OF THE INVENTION

Nuclear cameras, also known as scintillation cameras and gamma cameras are well known medical diagnostic imaging machines which are able to produce images of the gamma radiation field immediate from a medical patient having ingested a small quantity of a radioactive isotope. The large camera head is bulky and heavy, and in order to image better the radiation field, a collimator, usually made of lead, is attached to the aperture of the camera in order to accept gamma radiation within a specified angle of divergence from the line of sight of the camera. These collimators may have a mass ranging between 20 to 100 kg and have a thickness ranging from roughly 5 to 15 cm.

In the case that the camera is mounted to a drum or other form of rotating main frame unit, it is desirable to be able to adjust a radial position of the camera face with respect to its axis of rotatable mounting. Such rotatable mountings are used where the camera is to carry out a computed axial tomography (CAT) scan. Adjusting the radius of rotation of the camera about the patient allows for an adjustment of how close or far from the body axis of the patient the camera is to take its images. As patients may vary in size from children to very large adults, it is an advantage to be able to set the radius of rotation before carrying out a CAT scan.

It is known in the art to make the camera mounting radially adjustable as is shown in Japanese patent publication No. 58-30685 published Feb. 23, 1983. The disadvantages associated with the known mechanical positioner with adjustable radial position is that a separate linear track positioning means must be provided in the portion of the mounting unit which is rotatable about an axis of the patient's body.

SUMMARY OF THE INVENTION

It is an object of the present invention to provide a nuclear camera fork mounting having an offset which allows a radial position of the camera to be adjusted with respect to an axis of its rotation about the patient's body without increasing the cost or complexity of construction of the positioner.

In accordance with the invention, there is provided a medical diagnostic nuclear camera positioner apparatus comprising a rotating frame unit, a camera fork mounting means provided on the rotating frame unit, a camera fork rotatably mounted to the fork mounting means, the fork being rotatable about a first axis, and eccentric mounting means for rotatably mounting the nuclear camera to ends of the fork, the camera being rotatable about a second axis extending between the ends of the fork and at a distance with respect to the first axis. By rotating the camera 180° about the second axis, and the fork 180° about the first axis, an aperture of the camera faces in the same direction, but at a different radial position.

DETAILED DESCRIPTION OF THE PREFERRED EMBODIMENT

Figure 1:
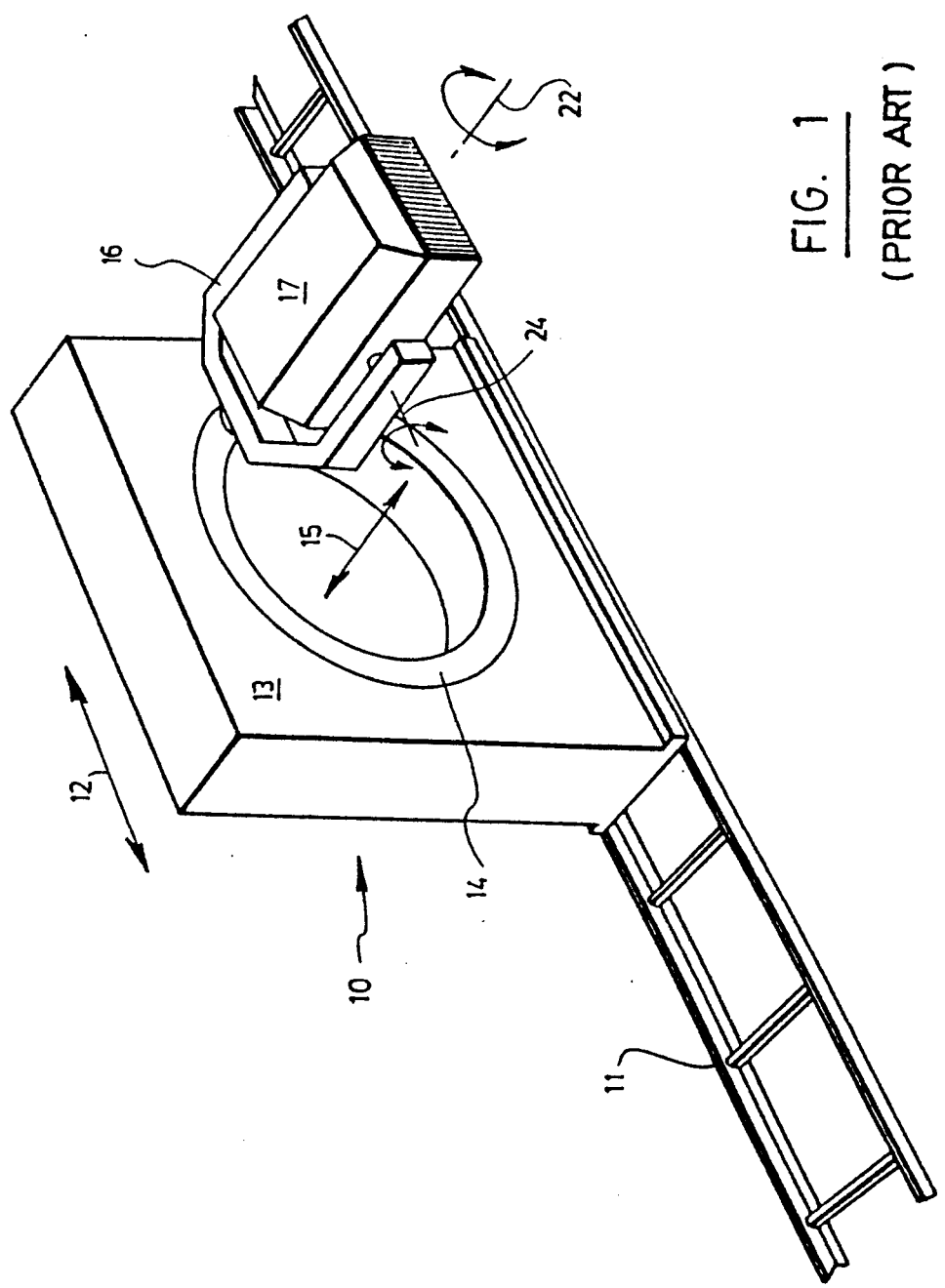
FIG. 1 shows a perspective view of a conventional nuclear camera positioner apparatus.

As shown in FIG. 1, the conventional nuclear camera mechanical positioner (10) may comprise a main frame unit (13) in which a rotating frame unit (14) is mounted and driven to rotatable axis (15). The unit (13) is translatable along track (11) in the direction of axis (12). A fork (16) is mounted to the drum (14) and rotates about axis (22). The camera (17) is mounted to the fork (16) and can rotate about axis (24).

Figure 2:
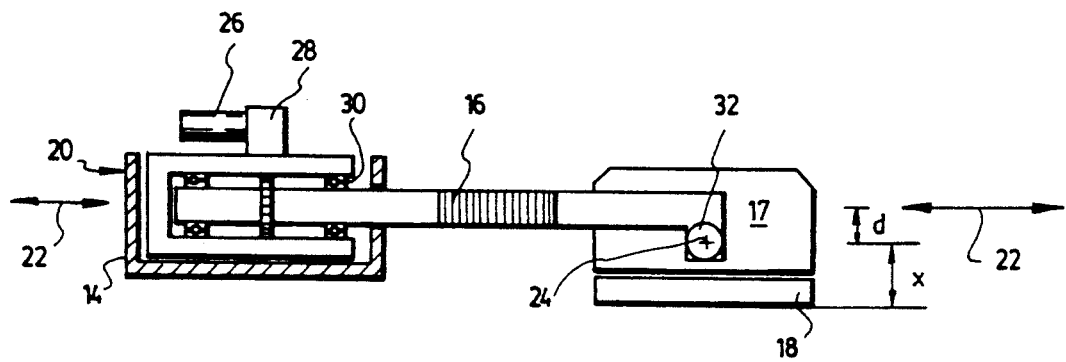
FIG. 2 is a side, partially cross-sectional view of the fork mounting according to the preferred embodiment.
Figure 4:
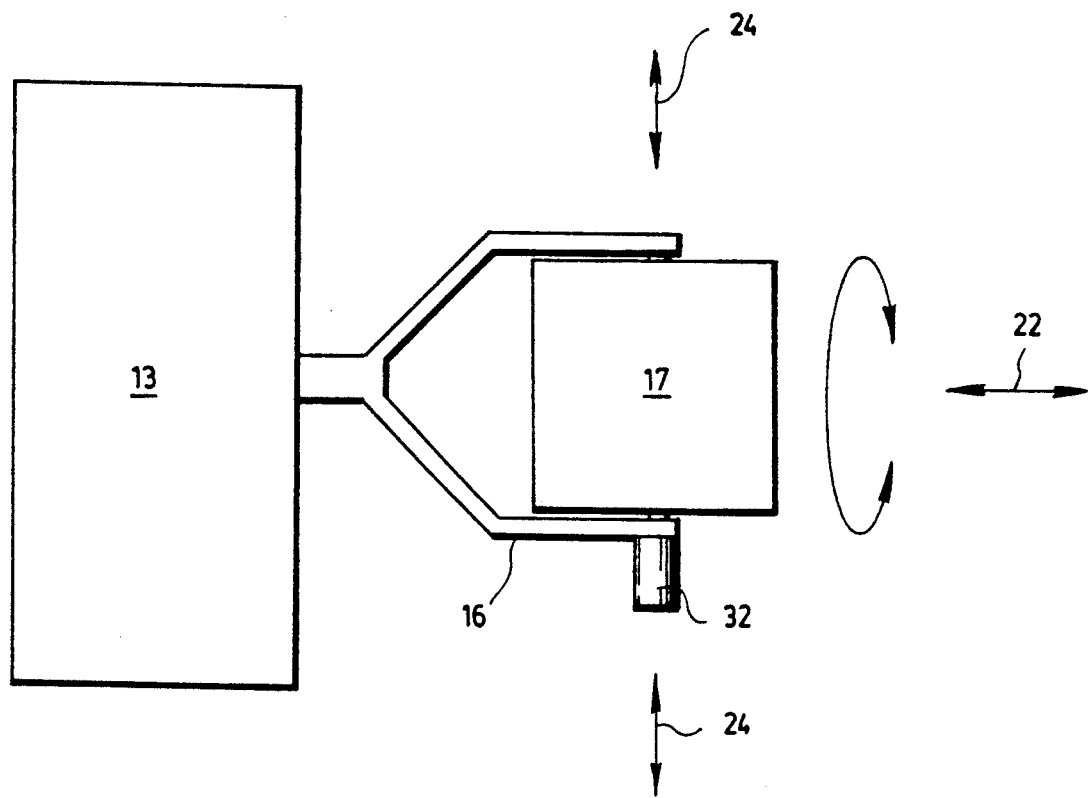
FIG. 4 is a top view of the preferred embodiment.

As shown in FIG. 2, camera fork mounting means (20) are provided on drum (14) and include a bearing mounting (30) for a shaft portion of fork (16). The fork mounting means include a motor (26) and a gearbox (28) for driving fork (16) to rotate about first axis (22). As best shown in FIG. 4, the camera (17) is mounted to fork (16) to rotate about axis (24). Eccentric mounting means include a motor drive (32) for driving the camera (17) about axis (24).

In the preferred embodiment, the perpendicular distance between first axis (22) and second axis (24) is 14 cm. This offset implies that axes (22) and (24) will no longer both pass through the expected center of gravity of camera (17) having collimator (18) attached thereto. Therefore, motor (26) can expect to feel some of the weight of camera (17) as it is rotated about axis (22). Ideally, the expected center of gravity of camera (17) should lie along axis (24).

The offset distance 'd' between the first axis and the second axis is slightly less than a distance 'x' between the second axis and the front face of the collimator (18) (see FIG. 2). In this way, when the camera (17) and fork (16) are inverted, as in FIG. 3, only a small distance 'y' between axis (22) and the front face remains.

Figure 3:
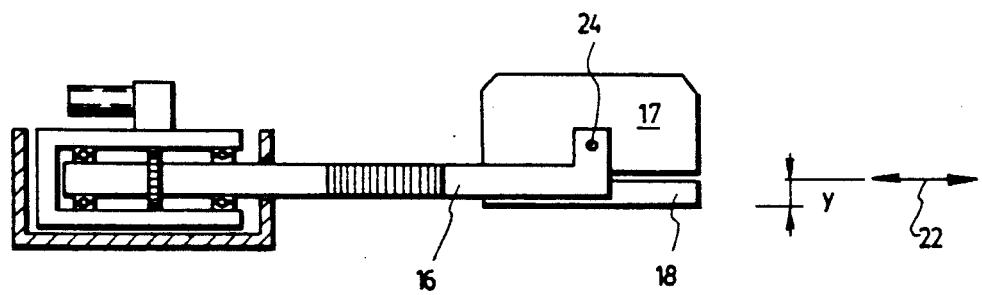
FIG. 3 is a view similar to FIG. 2 with the camera and fork each rotated by 180°.

As shown in FIG. 3, when fork (16) is rotated about axis (22) through 180° and likewise camera (17) is rotated about axis (24) through 180°, camera (17) is then positioned with collimator (18) displaced by twice the offset distance in a radial direction with respect to axis (22). In the case that camera (17) is carrying out a CAT scan, camera (17) is rotated about axis (22) until the camera faces axis (15) (see FIG. 1) and provided that the body axis of the patient is aligned with axis (15), the drum (14) is driven to rotate around axis (15) while image data is collected. In the case of a thin or small person, the camera would be configured as shown in FIG. 2, and in the case of a much larger adult, the configuration shown in FIG. 3 would be adopted. Alternatively, a lower body scan may permit the closer orbit configuration of FIG. 3, whereas an upper body scan may require the larger orbit configuration of FIG. 2.

Axis (24) need not be perpendicular to axis (22), and, for example, the fork (16) could rotatably hold camera (17) by its diagonal corners.

As can be appreciated, the fork rotating drive means (26) and (28) as well as the camera mounting means (32) are required components in the conventional camera positioner apparatus in order to be able to position the camera in a wide range of positions. Rotation about axis (24) is usually used for imaging the patient from a side angle. Without adding any extra degree of freedom, the offset mounting of the camera allows the radial position of the camera with respect to axis (15) to be adjusted for CAT scans with the minor requirement that the motor (26) needs to be able to handle greater loads.

I claim:

1. A medical diagnostic nuclear camera positioner apparatus comprising:

a rotating frame unit;

a camera fork mounting means provided on said unit for rotatably mounting and rotating a camera fork about a first axis; and eccentric mounting means for rotatably mounting a nuclear camera to ends of said fork, and for rotating said camera about a second axis extending between said ends and at an offset distance with respect to said first axis.

2. The apparatus as claimed in claim 1, wherein said second axis passes through an average expected center of gravity of said camera including a collimator.

3. The apparatus as claimed in claim 1, wherein said rotating frame unit is a drum mounted on a linearly translatable main frame unit.

4. Apparatus as claimed in claim 1, wherein said offset distance is approximately 14 cm.

5. Apparatus as claimed in claim 1, wherein said offset distance is approximately equal to a distance between said second axis and a front of said nuclear camera.

* * * * *